(12) United States Patent
Shen et al.

(10) Patent No.: US 8,665,720 B2
(45) Date of Patent: Mar. 4, 2014

(54) METHOD AND SYSTEM FOR DETERMINING LIMITED SOFT BUFFER SIZE ON TRANSPORT BLOCKS FOR RATE MATCHING

(75) Inventors: Bazhong Shen, Irvine, CA (US); Mark Kent, Vista, CA (US)

(73) Assignee: Broadcom Corporation, Irvine, CA (US)

(*) Notice: Subject to any disclaimer, the term of this patent is extended or adjusted under 35 U.S.C. 154(b) by 557 days.

(21) Appl. No.: 12/243,398

(22) Filed: Oct. 1, 2008

(65) Prior Publication Data

US 2009/0232050 A1 Sep. 17, 2009

Related U.S. Application Data

(60) Provisional application No. 61/035,867, filed on Mar. 12, 2008, provisional application No. 61/046,526, filed on Apr. 21, 2008.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 1/18* | (2006.01) |
| *H04L 12/56* | (2011.01) |

(52) U.S. Cl.
CPC ............ *H04L 1/0013* (2013.01); *H04L 1/0067* (2013.01); *H04L 1/18* (2013.01); *H04L 1/1812* (2013.01); *H04L 1/1816* (2013.01); *H04L 1/1819* (2013.01); *H04L 1/1835* (2013.01); *H04L 1/1874* (2013.01); *H04L 47/10* (2013.01); *H04L 47/14* (2013.01); *H04L 47/30* (2013.01)
USPC ........... 370/235; 370/326; 370/328; 714/748; 714/749

(58) Field of Classification Search
CPC ......... H04L 47/10; H04L 47/14; H04L 47/30; H04L 1/18; H04L 1/1812; H04L 1/1816; H04L 1/1819; H04L 1/1835; H04L 1/1874; H04L 1/0067; H04L 1/0013
USPC ................... 370/235, 236, 328; 714/748, 749
See application file for complete search history.

(56) References Cited

U.S. PATENT DOCUMENTS

| | | | | |
|---|---|---|---|---|
| 6,041,418 | A * | 3/2000 | Chen et al. ..................... | 713/400 |
| 2005/0220024 | A1 * | 10/2005 | Agin et al. ..................... | 370/235 |

(Continued)

*Primary Examiner* — Ayaz Sheikh
*Assistant Examiner* — Tarell Hampton
(74) *Attorney, Agent, or Firm* — Thomas|Horstemeyer, LLP.

(57) ABSTRACT

Aspects of a method and system for determining a limited soft buffer size on transport blocks for rate matching are provided. A data stream may be processed for transmission between a base station (eNodeB) and a UE via HARQ procedures. A two-stage rate-matching algorithm may be used in the HARQ procedures. A limited virtual soft buffer size at the UE in the two-stage rate-matching algorithm may be calculated on site based on channel condition information, available channel bandwidth, number of layers in spatial multiplexing, and the capacity of the UE, respectively. The data stream may be first rate-matched to the calculated limited soft buffer size available at the UE, and forwarded for second stage rate-matching to an actual physical channel size determined by the base station. The amount of bits forwarded for second stage rate-matching may equal to the calculated limited virtual soft buffer size of the virtual soft buffer.

20 Claims, 5 Drawing Sheets

(56) References Cited

U.S. PATENT DOCUMENTS

| | | | |
|---|---|---|---|
| 2007/0147326 A1* | 6/2007 | Chen | 370/338 |
| 2008/0320353 A1* | 12/2008 | Blankenship et al. | 714/746 |
| 2009/0073922 A1* | 3/2009 | Malladi et al. | 370/328 |
| 2009/0074103 A1* | 3/2009 | Varadarajan et al. | 375/295 |
| 2009/0207781 A1* | 8/2009 | Sidi et al. | 370/328 |

* cited by examiner

METHOD AND SYSTEM FOR DETERMINING LIMITED SOFT BUFFER SIZE ON TRANSPORT BLOCKS FOR RATE MATCHING

CROSS-REFERENCE TO RELATED APPLICATIONS/INCORPORATION BY REFERENCE

This patent application makes reference to, claims priority to and claims benefit from U.S. Provisional Patent Application Ser. No. 61/035,867 filed on Mar. 12, 2008.

This patent application also makes reference to, claims priority to and claims benefit from U.S. Provisional Patent Application Ser. No. 61/046,526 filed on Apr. 21, 2008.

Each of the above state applications is hereby incorporated herein by reference in its entirety.

FIELD OF THE INVENTION

Certain embodiments of the invention relate to signal processing for communication systems. More specifically, certain embodiments of the invention relate to a method and system for determining a limited soft buffer size on transport blocks for rate matching.

BACKGROUND OF THE INVENTION

The 3GPP Long Term Evolution (LTE) represents a major advance in cellular technology. LTE is designed to meet carrier needs for high-speed data and media transport as well as high-capacity voice support well into the next decade. It encompasses high-speed data, multimedia unicast and multimedia broadcast services. The LTE air interface standards aims to reduce delays, improve spectrum flexibility, and reduce cost for operators and end users.

The LTE physical layer (PHY) specifies a highly efficient means of conveying both data and control information between an enhanced base station (eNodeB) and mobile user equipment (UE). The LTE PHY performs a series of physical layer procedures such as, for example, synchronization procedures, cell search and timing synchronization, power control, random access procedure, CQI reporting and MIMO feedback, hybrid automatic repeat request (HARQ), and ACK/NACK detection, that enable data transport services. An N-channel Stop-and-Wait HARQ may be used in LTE to improve the robustness of data transmission over the wireless channel. Both IR (Incremental Redundancy) based HARQ and CC (Chase Combining) based HARQ may be supported.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for determining a limited soft buffer size on transport blocks for rate matching, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for determining a limited soft buffer size on transport blocks for rate matching. Various aspects of the invention may enable processing a data stream for transmission over the 3GPP LTE air-interface between an eNodeB and a UE. At the UE, a limited virtual soft buffer size may be calculated based on channel condition information, available channel bandwidth, number of layers in spatial multiplexing, and/or the capacity of the UE. The data stream may be rate-matched to the calculated limited soft buffer size available at the UE. The channel condition information may indicate an agreed channel quality indicator value (CQI) between the eNodeB and the UE for transmitting the data stream in a current transmission time interval (TTI). The number of layers in spatial multiplexing may be, for example, 1, 2, 3, or, 4, respectively. The UE capacity may be represented by the UE category class as defined in 3GPP LTE specification. Physical layer HARQ procedures, which may be in both the uplink and the downlink, may be performed for transmitting the data stream. The limited virtual soft buffer size at the UE 120 may be computed at the UE.

In various embodiment of the invention, a two stage rate-matching algorithm may be performed in the physical layer HARQ procedures. The 1st rate-matching stage may match the amount of data in the data stream to the calculated size of the limited virtual soft buffer. A second stage may match a portion of the data in the virtual soft buffer to an actual physical capacity of the channel. The actual physical capacity of the channel may be determined by the eNodeB at connection setup. A portion of the stored bits in the virtual soft buffer may be forwarded to the 2nd rate-matching stage so as to match to the actual physical capacity of the channel. The amount of bits or data in the forwarded portion of the virtual soft buffer may be equal to the calculated size of the virtual soft buffer.

Figure 1:
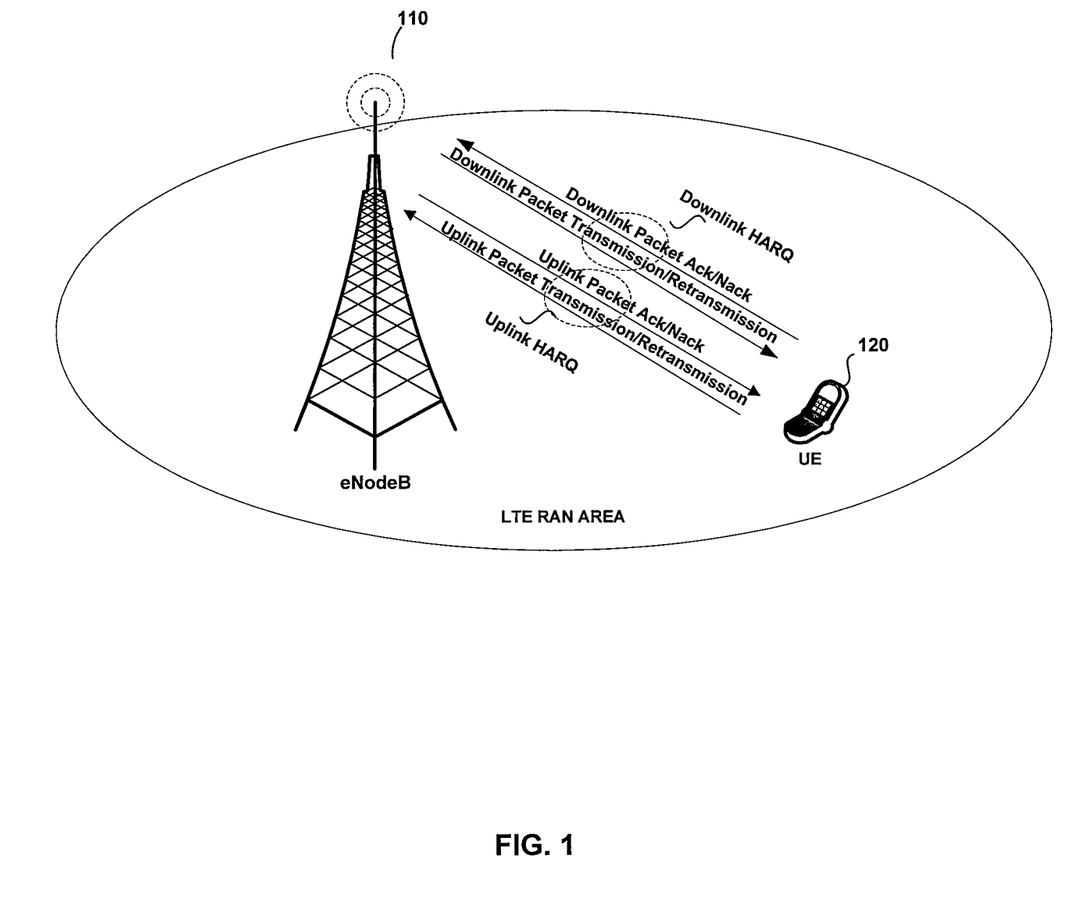
FIG. 1 is a diagram illustrating an exemplary LTE communication system enabled to determine limited soft buffer size on transport blocks for rate matching, in accordance with an embodiment of the invention.

FIG. 1 is a diagram illustrating and exemplary LTE communication system enabled to determine limited soft buffer size on transport blocks for rate matching, in accordance with an embodiment of the invention. Referring to FIG. 1, there is shown an enhance node B (eNodeB) or LTE base station 110 and a user equipment (UE) 120.

The eNodeB 110 may comprise suitable logic, circuitry and/or code that may enable establishment of connections or communication sessions over the LTE air interface, assigning air-interface resources, and performing scheduling and maintenance. The eNodeB 110 may employ the shared-channel principle to provide multiple users with dynamic access to the air interface. The eNodeB 110 may be configured to perform various procedures such as a physical layer HARQ (Hybrid Automatic Repeat Request) procedure with soft-combining for link adaptation to improve the performance of the shared channels.

A HARQ protocol may be used in the physical layer HARQ procedure to provide a fast physical layer retransmission scheme for coded data packets. The physical layer HARQ procedure may be performed either in a downlink or in an uplink as shown with respect to FIG. 1. For example, for a downlink HARQ procedure, the eNodeB 110 may send an encoded HARQ packet or a version of an encoded HARQ packet to a subscriber such as the UE 120. The UE 120 may attempt to decode the HARQ packet on a first HARQ attempt. In instances where the decoding is successful, the UE 120 may send an acknowledgement (ACK) to the eNodeB 110. Otherwise, the UE 120 may send a no-acknowledgement or negative acknowledgement (NAK) to the eNodeB 110. In response, the eNodeB 110 may send another HARQ attempt to the UE 120. The eNodeB 110 may continue to send HARQ attempts until the UE 120 may successfully decode the HARQ packet and may send an ACK back to the eNodeB 110.

The physical layer HARQ procedure, whether a downlink HARQ procedure or an uplink HARQ procedure, may be implemented utilizing a two-stage rate-matching. The two-stage rate-matching may be performed on a per-code block basis by utilizing a virtual soft buffer and subsequently transmitting a portion of contents of the virtual soft buffer for limited buffer rate matching (LBRM), or the entire contents of the virtual soft buffer for full buffer rate matching (FBRM). The physical layer HARQ procedure may be controlled by, for example, the limited virtual soft buffer size indicating the number of the rate-matched bits during a first rate-matching stage. In this regard, utilizing the LBRM, the eNodeB 110 may be enabled to calculate the limited virtual soft buffer size for each physical layer HARQ procedure, whether a downlink HARQ or an uplink HARQ, based on, for example, channel conditions, channel bandwidth, number of layers and/or the UE category class of a targeted UE such as the UE 120.

The UE 120 may comprise suitable logic circuitry and/or code that may be enabled to receive and/or transmit radio frequency signals from and/or to the eNodeB 110 across over the LTE air-interface. To enable a reliable data transport service, the UE 120 may enable one or more uplink physical layer HARQ procedures to restore distorted signals due to multipath created by, for example, signal reflection off various obstructions. In this regard, utilizing the LBRM, the UE 120 may be operable to compute the limited virtual soft buffer size for each uplink physical layer HARQ procedures based on, for example, channel conditions, channel bandwidth, number of layers and the UE category class of the UE 120.

In operation, the eNodeB 110 and the UE 120 may perform physical layer HARQ procedures for link adaptation to improve data throughput in a fading channel environment. With utilizing the LBRM, the limited virtual soft buffer sizes may be calculated on site, either at the eNodeB 110 and/or at the UE 120, based on the agreed channel conditions, channel bandwidth, number of layers and UE category class for the UE 120.

Figure 2:
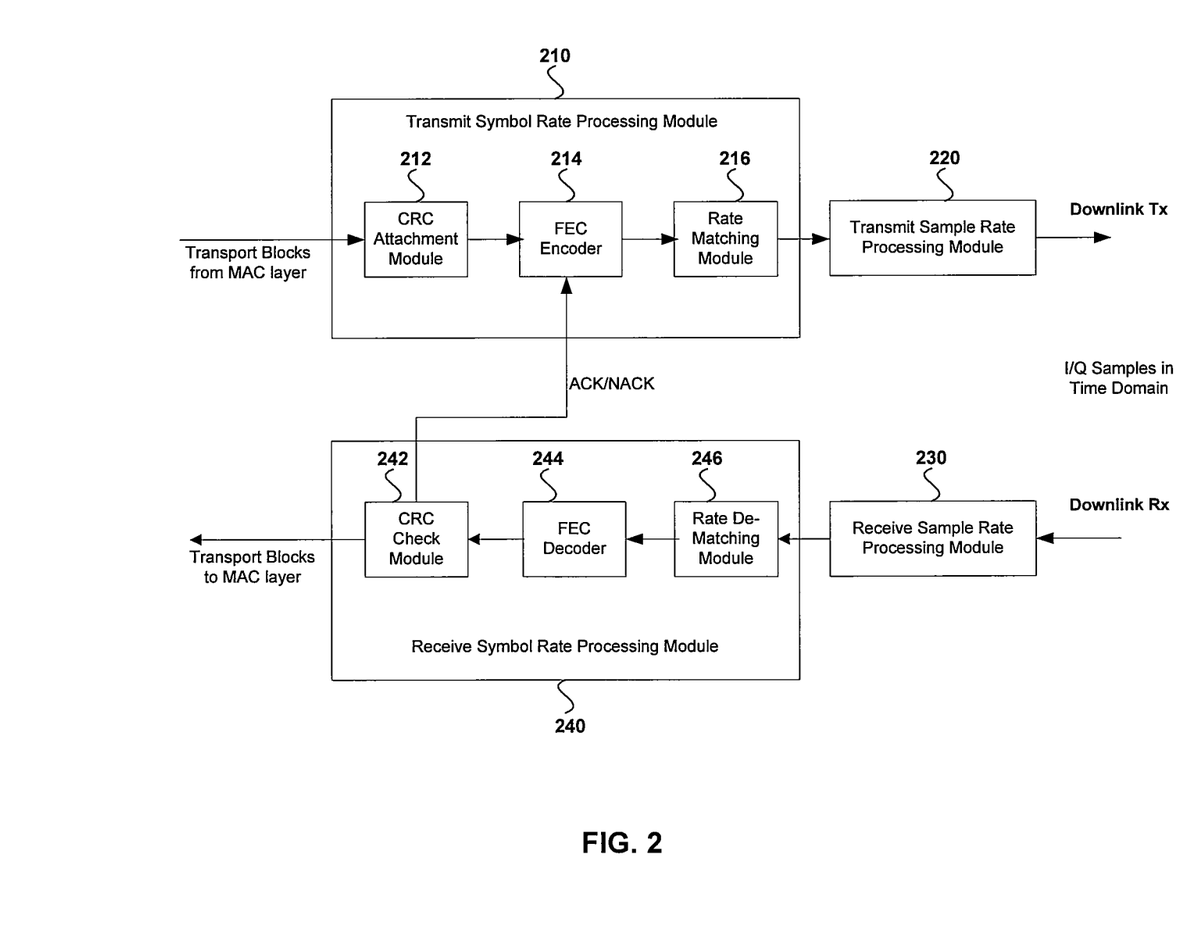
FIG. 2 is a diagram illustrating a LTE downlink physical layer HARQ processing, in accordance with an embodiment of the invention.

FIG. 2 is a diagram illustrating a LTE downlink physical layer HARQ processing, in accordance with an embodiment of the invention. Referring to FIG. 2, there is shown a transmit symbol rate processing module 210, a transmit sample rate processing module 220, a receive sample rate processing module 230, and a receive symbol rate processing module 240. The transmit symbol rate processing module 210 may comprise a CRC attachment module 212, a forward error correction (FEC) encoder 214 and a rate-matching module 216. The receive symbol rate processing module 240 may comprise a CRC checking module 242, a forward error correction (FEC) decoder 244, and a rate-dematching module 246.

The transmit symbol rate processing module 210 may comprise suitable logic, circuitry and/or code that may be centered around forward error correction (FEC) and may add redundancy to data streams in a bandwidth-efficient manner for data recovery at the receive side. The transmit symbol rate processing module 210 may start from a plurality of transport blocks from MAC (media access controller) layer and may output to the transmit sample rate processing module 220.

The CRC attachment module 212 may comprise suitable logic, circuitry and/or code that may be operable to add cyclic redundancy checks (CRCs) to each of the plurality of transport blocks from the MAC layer. Larger transport blocks may be segmented to ensure that the resulting blocks may not exceed a maximum size supported by, for example, the FEC encoder 214. The CRC attachment module 212 may append a CRC before the block is communicated to the FEC encoder 214.

The FEC (forward error correction) encoder 214 may comprise suitable logic, circuitry and/or code that may be operable to perform a FEC (forward error correction) coding during information transmission. The FEC may be accomplished by adding redundancy to the transmitted information using a predetermined algorithm such as Viterbi algorithm. The FEC encoder 214 may forward the coded data to the rate-matching module 216.

The rate-matching module 216 may comprise suitable logic, circuitry and/or code that may be operable to adjust packet size to match, for example, available resource. The rate-matching module 216 may perform bit repetition to increase bit rate or puncturing to decrease bit rate. A two-stage rate matching may be executed by the rate-matching module 216 for the physical layer HARQ procedures. The rate-matching module 216 may first adjust the number of bits of the output of the FEC encoder 214 to the size of a limited virtual soft buffer at a targeted UE such as the UE 120. The output bits of the first rate-matching stage may then be matched to the available bits in a transmission time interval (TTI) of a corresponding physical channel. The limited virtual soft buffer size at the UE 120 may represent an available UE soft-buffering capability. In this regard, the limited virtual soft buffer size at the UE 120 may be calculated at the UE 120. The limited virtual soft buffer size at the UE 120 may be determined based on channel condition information, channel bandwidth, number of layers and the UE category class of the UE 120. Accordingly, there may be no need for higher layers to signal the limited virtual soft buffer size of the UE 120 for performing physical layer HARQ procedures as described in current 3GPP LTE specification. The output of the rate-matching module 216 may be communicated to the transmit sample rate processing module 220.

The transmit sample rate processing module 220 may comprise suitable logic, circuitry and/or code that may be centered on various domain transitioning operations, from the frequency domain to the time domain, for transmission. For example, the IFFT operation may be performed at the transmit sample rate processing module 220 to generate a plurality of IQ signals for the OFDM part of the LTE baseband operation. The generated plurality of IQ signals may be transmitted to the UE 120 over the air.

The receive sample rate processing module 230 may comprise suitable logic, circuitry and/or code that may be operable to perform various operations follow the reverse operation of the transmit sample rate processing module 220. For example, the FFT operation may be performed at the receive sample rate processing module 230 to covert the received IQ signals back to the frequency domain. The output of the FFT operation may be further processed, for example, via converting corresponding OFDM resource grid mapping made in the transmission. The output of the receive sample rate processing module 230 may be forwarded to the rate-dematching module 246 of the receive symbol rate processing module 240.

The receive symbol rate processing module 240 may comprise suitable logic, circuitry and/or code that may be based on the forward error correction (FEC) to enable data recovery. The receive symbol rate processing module 240 may start from a plurality of packets from the receive sample rate processing module 230 and may output transport blocks to the MAC (media access controller) layer.

The rate-dematching module 246 may comprise suitable logic, circuitry and/or code that may be operable to perform rate matching via bit repetition or bit puncture. The rate-dematching module 246 may follow the reverse operations performed in the two-stage rate matching presented in the rate-matching module 216. The rate-dematching module 246 may adjust the number of bits from the receive sample rate processing module 230 to the size of the limited virtual soft buffer at the UE 120 and then match a portion of the number of bits from the limited virtual soft buffer to the output of the FEC encoder 214. In this regard, the limited virtual soft buffer size at the UE 120 may be calculated at the UE 120. The limited virtual soft buffer size at the UE 120 may be determined based on channel condition information, channel bandwidth, number of layers and the UE category class of the UE 120. The output of the rate-dematching module 246 may be passed to the FEC decoder 244.

The forward error correction (FEC) decoder 244 may comprise suitable logic, circuitry and/or code that may be operable to convert modulation symbols to individual bits. The FEC decoder 244 may follow the reverse operations performed in the FEC encoder 214.

The CRC checking module 242 may comprise suitable logic, circuitry and/or code that may be operable to check CRC validity and reassemble packets from the FEC decoder 244 to original transport blocks. The CRC checking module 242 may send ACK/NACK information to the transmit side for packet retransmission based on the CRC validity check on data packets received.

In operation, referring to FIG. 2, on the transmit side, the transmit symbol rate processing module 210 may perform various operations on forward error correction (FEC). The transmit symbol rate processing module 210 may acquire transport blocks from the media access controller (MAC) layer. The transport blocks may have cyclic redundancy checks (CRCs) appended at the CRC attachment module 212 and the resulting blocks may be communicated to the FEC encoder 214 for FEC encoding. Following the FEC encoding, rate matching may be applied to the output of the FEC encoder 214 to puncture or repeat the data at the rate-matching module 216 so that it may fill the available resource blocks. The two-stage rate matching may be implemented at the rate-matching 216. The rate-matching 216 may first adjust the number of bits of the output of the FEC encoder 214 to the limited virtual soft buffer size at the UE 120 and then match the resulting output bits from the first rate-matching stage to the available bits in a transmission time interval (TTI) of the physical channel. In this regard, the limited virtual soft buffer size at the UE 120 may be calculated at the UE 120 based on, for example, channel condition information, channel bandwidth, number of layers and/or the UE category class of the UE 120. The output of the rate-matching module 216 may be communicated to the transmit sample rate processing module 220 for performing, for example, the OFDM part of the LTE baseband operation. The transmit sample rate processing module 220 may output a plurality of IQ signals in the time domain for transmission.

On the receive side, the receive processing generally may follow the reverse of the transmit processing. The receive sample rate processing module 230 may perform various operations on the OFDM part of the baseband operation. The output of the receive sample rate processing module 230 may be forwarded to the rate-dematching module 246 so that the number of bits from the receive sample rate processing module 230 may be matched to the size of the limited virtual soft buffer at the UE 120 and then to the number of bits of an encoding block for the FEC decoder 244. In this regard, the limited virtual soft buffer size at the UE 120 may be calculated on site (at the eNodeB 110 and/or the UE 120) based on channel condition information, channel bandwidth, number of spatial layers, and/or the category class of the UE 120, respectively. The output of the rate-dematching module 246 may be forwarded to the FEC decoder 244. The FEC decoder 244 may take modulation symbols and convert them to individual bits. The output of the FEC decoder 244 may be checked at the CRC check module 242 for CRC validity and reassembled into the original transport blocks. The CRC check module 242 may be enabled to send ACK/NACK information to the FEC encoder 214 on the transmit side for retransmission on data packets received.

Figure 3:
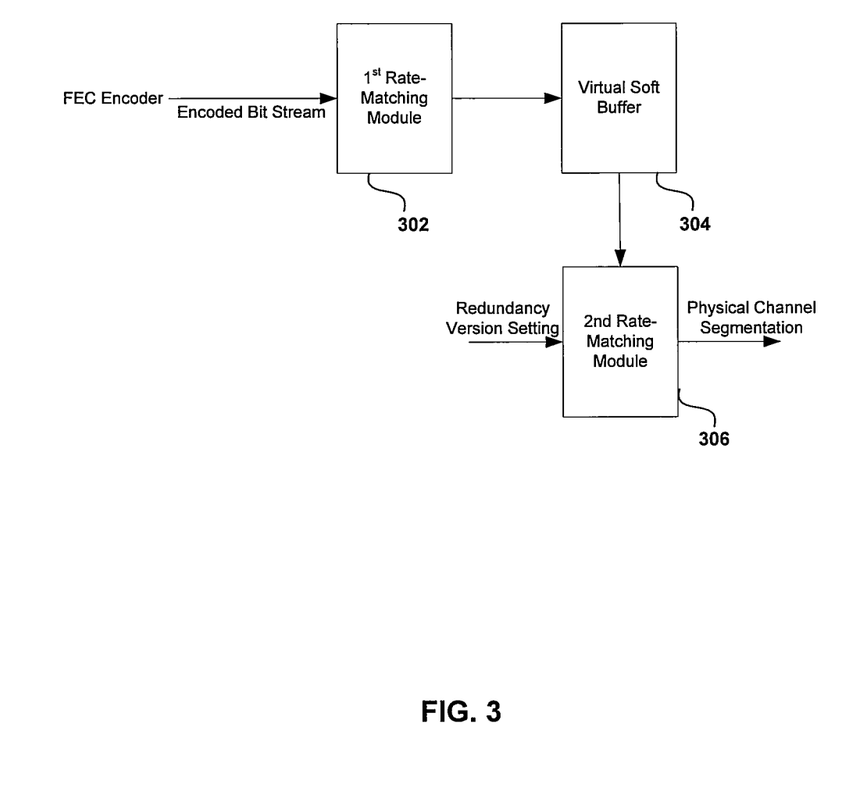
FIG. 3 is a diagram illustrating a two-stage rate matching system, in accordance with an embodiment of the invention.

FIG. 3 is a diagram illustrating a two-stage rate matching system, in accordance with an embodiment of the invention. Referring to FIG. 3, there is shown a first rate-matching module 302, a virtual soft buffer 304, and a second rate-matching module 306.

The first rate-matching module 302 may comprise suitable logic, circuitry and/or code that may be enabled to puncture (throw away) or repeat selected bits of an encoded bit stream as necessary, so that the total number of bits in the encoded bit stream may match the limited virtual soft buffer size of the virtual soft buffer 306, for example.

The virtual soft buffer 304 may comprise suitable logic circuitry and/or code that may provide a buffer between the rate-matching stages to allow tuning of the redundancy settings for different retransmissions between the rate-matching stages. For example, the retransmission in a physical layer HARQ procedure, whether a downlink HARQ procedure or an uplink HARQ procedure, may be either the same data bits as were sent last time comprising information bits, and/or a new set of parity bits with or without information bits. In this regard, the limited virtual soft buffer size of the virtual soft buffer 306 may be determined based on agreed channel condition indicated by channel quality indicator value (CQI), channel bandwidth, number of layers and the corresponding UE category class, which may be determined by the eNodeB 110 and signaled to the UE 120. In this way, the limited virtual soft buffer size may be calculated on site (at the UE 120 and/or at the eNodeB 110) without high layer signaling.

The second rate-matching module 306 may comprise suitable logic circuitry and/or code that may be enabled to further puncture (repeat) the bits stored in the virtual soft buffer 306 so that the final number of bits may be equal to the actual physical channel rate signaled by the eNodeB 110 at the connection setup. The specific data bits punctured or repeated by the second stage may be determined by a selected set of parameters referred to as a redundancy version RV. The redundancy version may change each time when a request for retransmission of the data packet may be made, and may be signaled by the eNodeB 120 to the UE 120.

In operation, the LTE physical layer may rely on rapid adaptation to channel variations by means of employing various physical layer procedures, for example, the physical layer HARQ procedures. A data stream may be processed via a transport channel coding process before proceeding for transmitting. During the transport channel coding process, the 1st rate-matching module 302 may match the number of bits in an encoded bit stream to the limited virtual soft buffer size of the virtual soft buffer 306. A portion of the stored bits in the virtual soft buffer 306 may be forwarded to the 2nd rate-matching module 306 to further match to the actual physical channel size. The limited virtual soft buffer size of the virtual soft buffer 306 may be calculated at the UE 120 and may be determined based on agreed CQI, channel bandwidth, number of layers and/or the category class of the UE 120.

Figure 4:
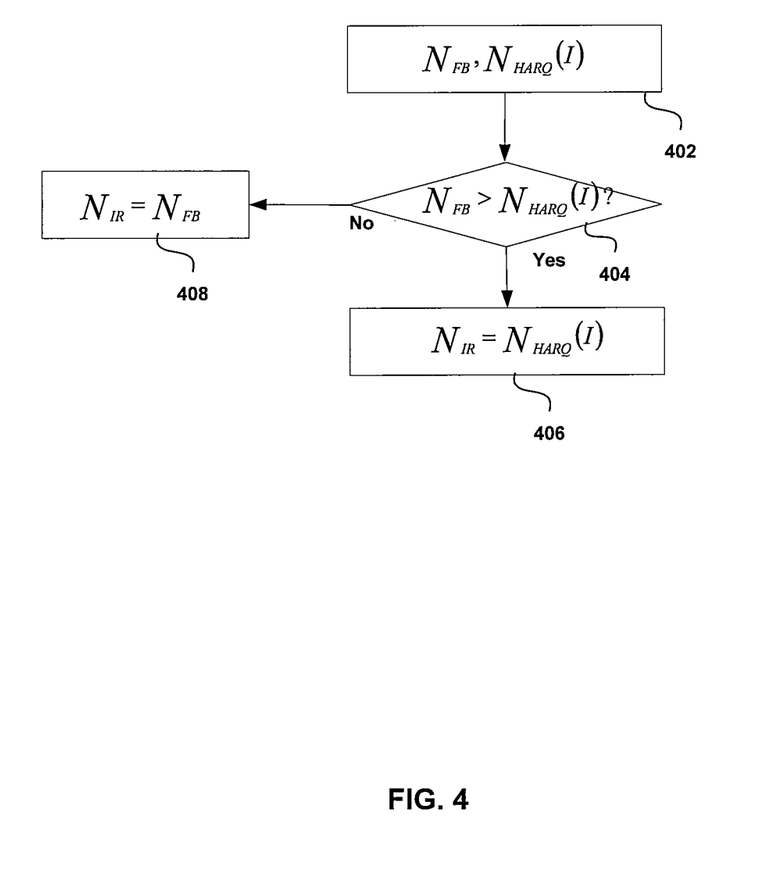
FIG. 4 is a flow chart illustrating exemplary steps for calculating a limited virtual soft buffer size with one layer in spatial multiplexing, in accordance with an embodiment of the invention.

FIG. 4 is a flow chart illustrating exemplary steps for calculating a limited virtual soft buffer size with one layer in spatial multiplexing, in accordance with an embodiment of the invention. Referring to FIG. 4, where $N_{IR}$ may represent the limited virtual soft buffer size of the virtual soft buffer 306, $N_{FB}$ may represent the full virtual soft buffer size of the virtual soft buffer 306, respectively. In an exemplary embodiment of the invention, up to 8 HARQ processes may be supported simultaneously for each connection and $N_{HARQ}(I)$ may represent the virtual soft buffer size of the virtual soft buffer 306 for the I-th HARQ processor. One transport block (TB) may be presented in every transmit time interval (TTI) with one layer in spatial multiplexing. The exemplary steps may begin with step 402, where $N_{IR}$ may need to be determined for the I-th HARQ processor with $N_{FB}$ and $N_{HARQ}(I)$. In step 404, a comparison may be made between $N_{FB}$ with $N_{HARQ}(I)$. In instances where $N_{FB}$ may be greater than $N_{HARQ}(I)$, then in step 406, the limited virtual soft buffer size for the I-th HARQ processor may be set as follows:

$$N_{IR}=N_{HARQ}(I).$$

In step 404, in instances where $N_{FB}$ may be less than or equal to $N_{HARQ}(I)$, then in step 408, the limited virtual soft buffer size for the I-th HARQ processor may be set as follows:

$$N_{IR}=N_{FB}.$$

Figure 5:
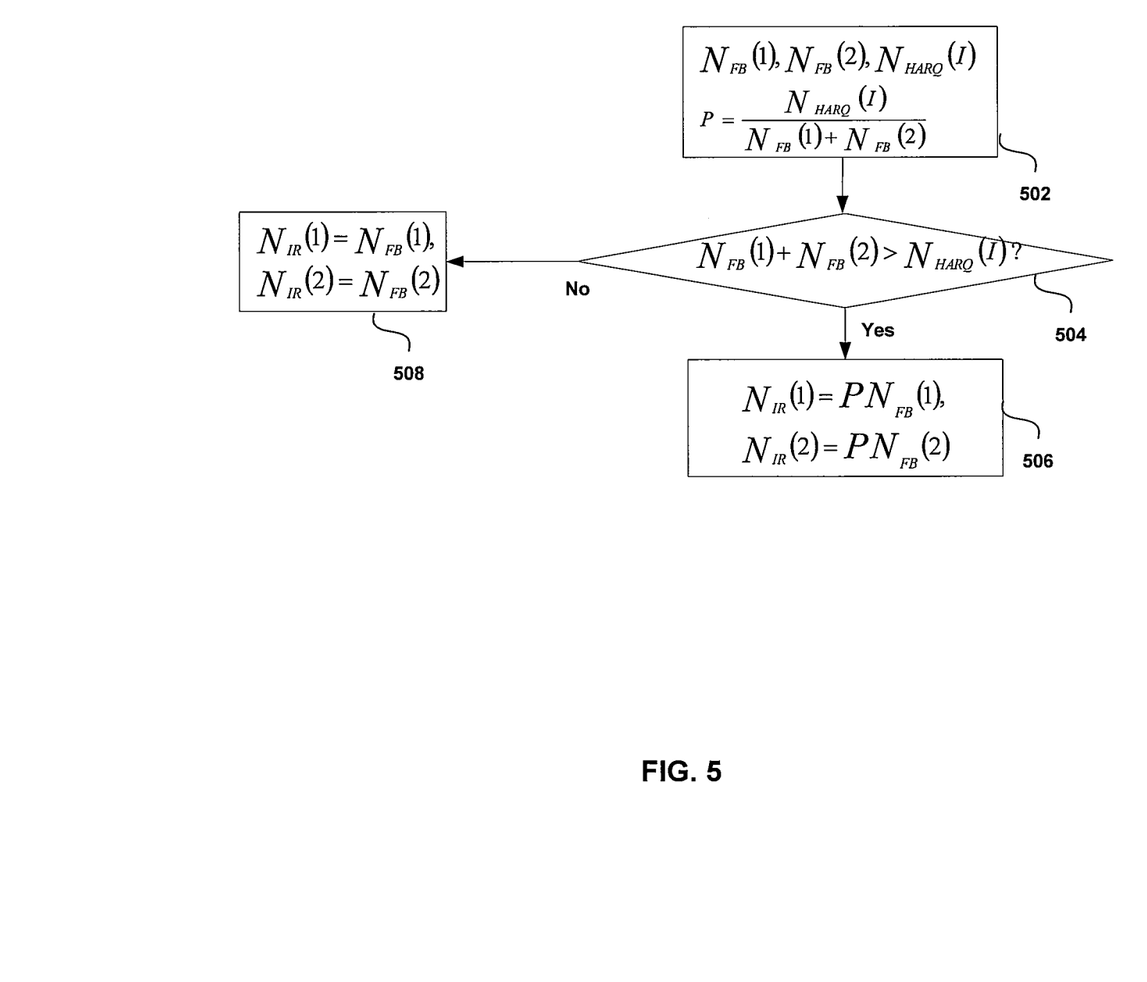
FIG. 5 is a flow chart illustrating exemplary steps for calculating limited virtual soft buffer sizes with two, three, and four layers in spatial multiplexing, in accordance with an embodiment of the invention.

FIG. 5 is a flow chart illustrating exemplary steps for calculating limited virtual soft buffer sizes with two, three, and four layers in spatial multiplexing, in accordance with an embodiment of the invention. Referring to FIG. 5, where two transport blocks (TB) may be presented in for the same channel bandwidth with two, three, and four layers in spatial multiplexing. In this regard, the corresponding number of resource blocks may be the same although two TB sizes may be different in every transmit time interval (TTI). $N_{FB}(1)$ and $N_{FB}(2)$ may represent the full virtual soft buffer sizes for the two TBs, respectively. $N_{IR}$ and $N_{HARQ}(I)$ may be defined in the same way as described in FIG. 4. P may represent the portion out of the total full virtual soft buffer sizes for the two TBs assigned for the I-th HARQ processor. The exemplary steps may begin with step 502, where the parameter P may be set as follows:

$$P = \frac{N_{HARQ}(I)}{N_{FB}(1) + N_{FB}(2)}.$$

In step 504, $N_{FB}(1)+N_{FB}(2)$ may be compared with $N_{HARQ}(I)$. In instances where $N_{FB}(1)+N_{FB}(2)$ may be greater than $N_{HARQ}(I)$, then in step 506, the limited virtual soft buffer size for the first TB may be set as follows:

$$N_{IR}(1)=PN_{FB}(1),$$

and the limited virtual soft buffer size for the second TB may be set as:

$$N_{IR}(2)=PN_{FB}(2).$$

In step 504, in instances where $N_{FB}(1)+N_{FB}(2)$ may be less than or equal to $N_{HARQ}(I)$, the limited virtual soft buffer size for the first TB may be set as follows:

$$N_{IR}(1)=N_{FB}(1), \text{ and}$$

the limited virtual soft buffer size for the second TB may be set as follows:

$$N_{IR}(2)=N_{FB}(2).$$

Aspects of a method and system for determining limited soft buffer size on transport blocks for rate matching are provided. In accordance with various embodiments of the invention, a data stream such as the encoded bit stream from the FEC encoder 214 may be processed for transmission over the 3GPP LTE air-interface between the eNodeB 110 and the UE 120. The limited virtual soft buffer size at the UE 120 may be calculated based on channel condition information, channel bandwidth, number of layers, and the UE capacity of the UE 120, respectively. The data stream may be rate-matched to the calculated limited soft buffer size available at the UE 120. With regard to the parameters used for computing the limited virtual soft buffer size at the UE 120, the channel condition information may indicate an agreed channel quality indicator value (CQI) between said BS and the UE for transmitting the data stream in current transmission interval. The number of layers utilized for spatial multiplexing may be 1, 2, 3, or, 4, respectively. The UE capacity may indicate the UE category class of the UE 120. Physical layer HARQ procedures may be performed for transmitting the data stream by using a HARQ (Hybrid Automatic Repeat Request) protocol as presented in FIG. 1 and FIG. 2, respectively.

The physical layer HARQ procedures may comprise both downlink HARQ procedures and uplink HARQ procedures. The calculation of the limited virtual soft buffer size at the UE 120 may be done at the eNodeB 110 and/or the UE 120. A two stage rate-matching algorithms as described with respect to FIG. 3 may be used in the physical layer HARQ procedures. A 1st rate-matching module 302 may match the amount of data in the data stream to the calculated limited virtual soft buffer size of the virtual soft buffer 306, and further match to the actual physical channel size, which may be predetermined by the eNodeB 110 at connection setup, for example. The soft buffer 306 may be formed between the two rate-matching stages as shown in FIG. 3. A portion of the stored bits in the virtual soft buffer 306 may be forwarded to the 2nd rate-matching module 306 to match to the actual physical channel size, wherein the amount of bits in the forwarded portion may equal to the calculated limited virtual soft buffer size of the virtual soft buffer 306.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for determining limited soft buffer size on transport blocks for rate matching.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in a user equipment comprising a processor:
      matching an amount of data in a data stream to a size of a portion of a virtual soft buffer that is available for transmission of said data stream, wherein:
      said processor is coupled to said virtual soft buffer, and said processor is operable to handle said transmission of said data stream; and
      said size of said portion of said virtual soft buffer is calculated at said user equipment based on:
         a size of said virtual soft buffer for full rate-matching for said transmission of said data stream; and
         sizes of corresponding portions of said virtual soft buffer that are utilized for said full rate-matching to handle entire transmissions assigned to said processor; and
      matching a portion of data stored in said virtual soft buffer to an actual physical capacity of a channel utilized by said user equipment for wireless communication of said data stream.

2. The method according to claim 1, comprising determining a number of storage data locations available at said user equipment for said size of said portion of said virtual soft buffer.

3. The method according to claim 1, comprising determining said size of said portion of said virtual soft buffer that is available in said user equipment based on at least one of channel condition information or channel bandwidth.

4. The method according to claim 3, wherein said channel condition information is specified by a channel quality indicator (CQI).

5. The method according to claim 1, comprising determining said size of said portion of said virtual soft buffer based on a number of layers utilized for spatial multiplexing during said wireless communication of said data stream.

6. The method according to claim 5, wherein said number of layers utilized for said spatial multiplexing is one of 1, 2, 3, or 4.

7. The method according to claim 1, wherein said data stream is communicated over a 3GPP LTE air-interface.

8. The method according to claim 1, wherein said matching said amount of data in said data stream occurs dynamically, and said matching said portion of said data stored in said virtual soft buffer occurs dynamically.

9. The method according to claim 8, comprising determining when said size of said portion of said virtual soft buffer is equal to a number of bit storage locations available at said user equipment.

10. The method according to claim 9, comprising matching said size of said portion of said virtual soft buffer to said actual physical capacity of said channel based on said determining.

11. A system for communication, the system comprising:
   one or more circuits for use in a user equipment, said one or more circuits comprising a processor, wherein:
      said one or more circuits are operable to match an amount of data in a data stream to a size of a portion of a virtual soft buffer that is available for transmission of said data stream, wherein:
         said processor is coupled to said virtual soft buffer, and said processor is operable to handle said transmission of said data stream; and
         said size of said portion of said virtual soft buffer is calculated at said user equipment based on:
            a size of said virtual soft buffer for full rate-matching for said transmission of said data stream; and
            sizes of corresponding portions of said virtual soft buffer that are utilized for said full rate-matching to handle entire transmissions assigned to said processor; and
      said one or more circuits are operable to match a portion of data stored in said virtual soft buffer to an actual physical capacity of a channel utilized by said user equipment for wireless communication of said data stream.

12. The system according to claim 11, wherein said one or more circuits are operable to determine a number of storage data locations available at said user equipment for said size of said portion of said virtual soft buffer.

13. The system according to claim 11, wherein said one or more circuits are operable to determine said size of said portion of said virtual soft buffer that is available in said user equipment based on at least one of channel condition information or channel bandwidth.

14. The system according to claim 13, wherein said channel condition information is specified by a channel quality indicator (CQI).

15. The system according to claim 11, wherein said one or more circuits are operable to determine said size of said portion of said virtual soft buffer based on a number of layers utilized for spatial multiplexing during said wireless communication of said data stream.

16. The system according to claim 15, wherein said number of layers utilized for said spatial multiplexing is one of 1, 2, 3, or 4.

17. The system according to claim 11, wherein said data stream is communicated over a 3GPP LTE air-interface.

18. The system according to claim 11, wherein said one or more circuits are operable to match said amount of data in said data stream dynamically, and match said portion of said data stored in said virtual soft buffer dynamically.

19. The system according to claim 18, wherein said one or more circuits are operable to determine when said size of said portion of said virtual soft buffer is equal to a number of bit storage locations available at said user equipment.

20. A method for communication, the method comprising:
  in at least one of a base station or a user equipment comprising a processor:
    matching an amount of data in a data stream to a size of a portion of a virtual soft buffer that is available for transmission of said data stream based on:
      a size of said virtual soft buffer for full rate-matching transmissions for a Hybrid Automatic Repeat Request (HARQ) procedure; and
      sizes of portions of said virtual soft buffer that are utilized for said full rate-matching to handle corresponding ones of said transmissions for said HARQ procedure; and
    performing rate-matching on each of said transmissions for said HARQ procedure utilizing said sizes of said portions of said virtual soft buffer.

\* \* \* \* \*